United States Patent [19]

Weaver

[11] 4,377,364
[45] Mar. 22, 1983

[54] SILO UNLOADING APPARATUS

[76] Inventor: Richard L. Weaver, R.D. 4, Myerstown, Pa. 17067

[21] Appl. No.: 191,071

[22] Filed: Sep. 26, 1980

[51] Int. Cl.³ .............................................. B65G 65/46
[52] U.S. Cl. .................................... 414/307; 198/661; 414/306; 414/310
[58] Field of Search .............................. 414/306–312; 222/404

[56] References Cited

U.S. PATENT DOCUMENTS

| | | | |
|---|---|---|---|
| 2,675,931 | 4/1954 | Makous | 414/307 |
| 3,394,825 | 7/1968 | Reed | 414/308 |
| 4,057,151 | 11/1977 | Weaver | 414/311 |
| 4,095,703 | 6/1978 | Weaver | 414/307 |

Primary Examiner—Robert G. Sheridan
Attorney, Agent, or Firm—Paul & Paul

[57] ABSTRACT

Silo unloading apparatus of the bottom unloading type is provided, wherein an auger is mounted for rotation on its own axis and for arcuate sweeping motion across the floor of the silo, conveying silage toward a central opening, and a single drive is provided for driving a central shaft that both rotates the auger about its own axis, and which rotates an intermediate mechanism that transfers relatively uniform rotational motion from the shaft into an intermittent rotational motion whereby a band located in the silo floor and spaced from the center of the silo is incrementally driven preferably by means of a toothed wheel, for incrementally sweeping the auger across the silo floor. The band is carried in a generally circular track in the floor of a silo and a cover for the opening into the track is provided, carried by the band for movement therewith. The auger is constructed to vary in pitch at different locations along its length, and to vary in flite depth along its length, and is constructed of different diameter stages. An exit auger is constructed to vary in flite depth and consequently in depth of bite, along its length as it conveys silage.

7 Claims, 5 Drawing Figures

SILO UNLOADING APPARATUS

BACKGROUND OF THE INVENTION

The present invention is directed to the art of unloading a silo, and particularly to silo unloader of the bottom unloading type, wherein silage is conveyed toward a central opening in the silo floor, to drop down a chute from that opening, into a zone beneath the silo floor, and then to be delivered from that zone to a point outside the silo, by means of an exit auger. Similar devices have been developed in the past, which as are shown in my U.S. Pat. Nos. 4,095,703 and 4,057,151. Such devices work very well, most particularly when silage is of the type that may be highly compacted, and perhaps damp, requiring substantial power to move the silage.

The present invention is directed to silo unloaders of the bottom unloader types, in which it is desired to unload a highly granular silage product; one that is either semi-free flowing or free flowing. An example of such silage would be dried corn kernels, which do not tend to stick one to the other, but readily flow into various areas and voids, rather than tending to form a silage bridge at the bottom of the silo. One feature of unloading highly granular silage is that the power requirements are less than when unloading highly damp, compacted silage.

To this end, the present invention is addressed to silage unloaders of the granular type, wherein free flowing material, or semi-free flowing material is used.

SUMMARY OF THE INVENTION

The present invention is directed toward an intermittent rotationally provided drive for an auger advancing band that is located in a silo floor, with the band drive allowing successive presses of the auger into the silage, and with the intermittent drive being provided from a generally constant rotational drive that is taken off the same vertical shaft at the center of the silo opening that drives the auger for rotation on its own axis. A cover for the track opening in the silo floor is provided, to keep granular material from flowing into the track. Particularly novel auger construction is provided, to allow essentially equal amounts of material to be fed into the spaces between the auger fliting, along the length of the auger, and this is provided by allowing variation in fliting pitch that enlarges the conveyance capacity along the auger, and by increasing the bite of the auger into silage into its length because of increased length of auger fitting therealong. Similar auger features are provided for the exit auger which conveys silage discharged through the central opening in the silo, into a void beneath the silo, to a location outside the silo.

Accordingly, it is a primary object of this invention to provide a novel combination drive for an auger conveyor of the silo bottom unloader type, in which a common rotary drive is used to provide the motion for both rotating the auger on its own axis, and for providing intermittent advancement of the auger in its arcuate sweep across the silo floor.

It is another object of this invention to accomplish the above object, wherein a band type drive is utilized, that in turn is driven by a toothed wheel or sprocket that is intermittently driven.

It is another object of this invention to effect automatic disconnection of the auger advance upon meeting excessive silage resistence.

It is a further object of this invention to provide novel auger constructions for conveying granular free flowing silage and semi-free flowing silage, so as to feed silage to the auger, substantially continuously, along its length, and such that the auger is able to accept silage substantially continuously along its length, as it is rotating.

It is a further object of this invention to provide a shield for preventing highly granular silage from entering into the track beneath the silo floor, without inhibiting the movement of the auger in its sweep across the silo floor.

It is another object of this invention to provide novel auger drive mechanisms.

Other objects and advantages will be readily understood from a reading of the following brief descriptions of the drawing figures, detailed descriptions of the preferred embodiments, and the appended claims.

BRIEF DESCRIPTIONS OF THE DRAWING FIGURES

DETAILED DESCRIPTION OF THE PREFERRED EMBODIMENTS

Figure 1:
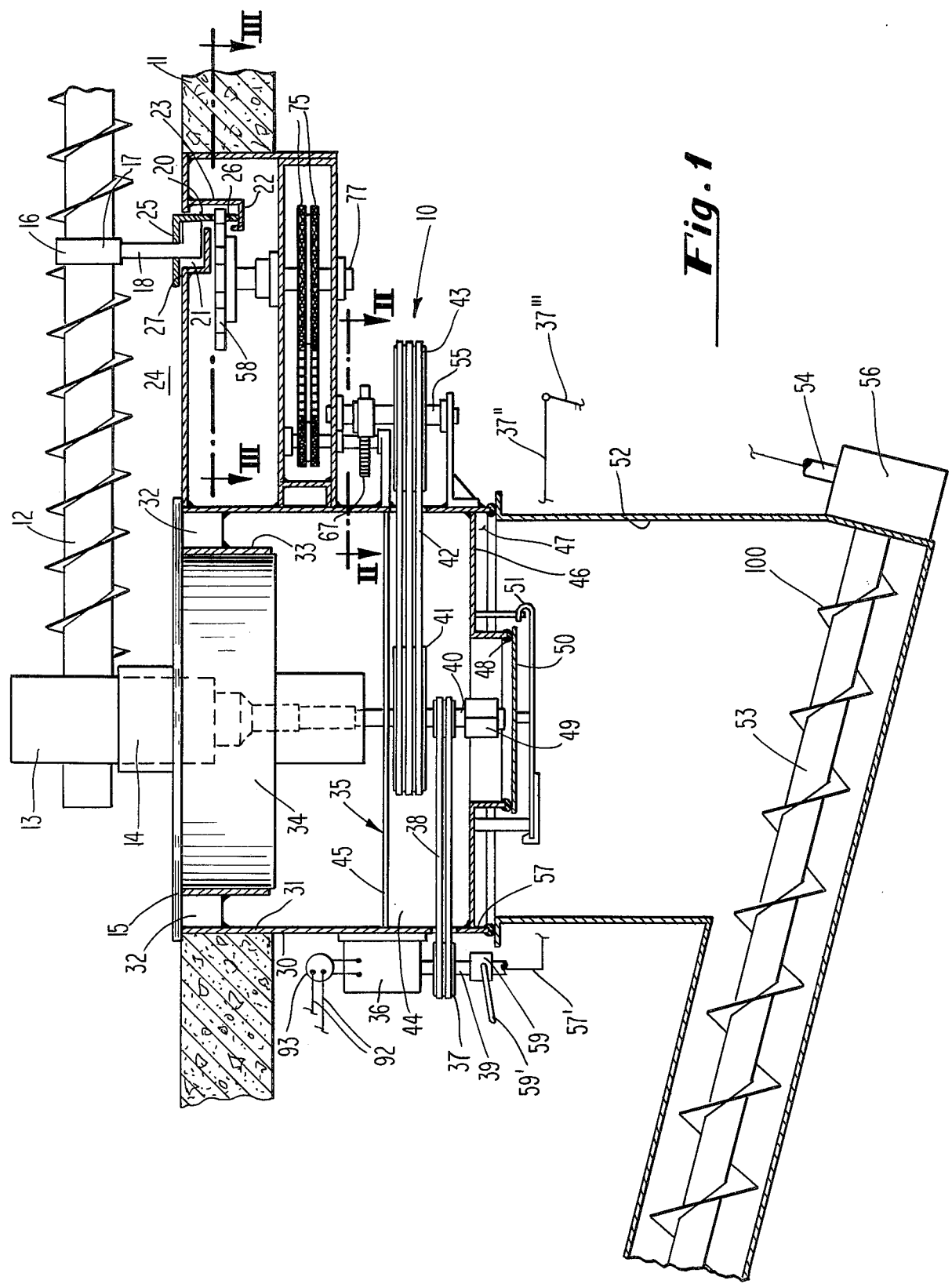
FIG. 1 is a fragmentary vertical sectional view, taken through a silo and unloader mechanism in accordance with this invention.

Referring now to the drawings in detail, reference is first made to FIG. 1, wherein the unloading apparatus of this invention is generally designated by the numeral 10. The lower floor of the silo is designated by the numeral 11. The auger 12 is mounted at its radial inner most end in a suitable bearing 13 suitably carried on gearbox 14, that in turn is mounted on a plate 15. A radially outward portion of the auger 12 is carried by an auger support 16, comprising a bearing 17 and a support arm 18. The support arm 18 is welded or otherwise suitably secured to a generally circular band 20, constructed to be similar to the band disclosed in my above-mentioned U.S. Pat. No. 4,057,151. The band 20 is carried in a generally circular track 21 in the floor 11 of the silo, and is supported therein on leg 22 of L-shaped support 23. It will be seen that the track 21 is otherwise open to the interior of the silo 24, but is shielded from communication with the silo 24, by a generally circular cover 25 that in turn is welded to or otherwise suitably secured to the band 20 at its upper end, and moves with the band 20 during the arcuate sweeping motion of the auger 12 across the floor of the silo. The band 20 has a plurality of uniformly spaced apart openings 26 therein to facilitate driving of the band. During driving of the band, the band carries the cover 25 which slides over the floor portion 27 of the silo, preventing inflow of free flowing or semi-free flowing granular silage into the track 21, thereby preventing accumulation of silage in the track, in the vicinity of the band, which accumulation might otherwise interfere with the movement of the band and consequently the sweeping rotation of the auger.

The silage central discharge chute is indicated at 30, as comprising a cylindrical, generally sheet steel construction, securely embedded in and carried by the floor of the silo, as at 31. A plurality of supports 32 extend radially inwardly, and carry a cylindrical opening member 33.

A gearbox support 34 extends diametrically across cylinder 33, allowing silage flow between outer side of support 34 and the inner wall of cylinder 33. At the upper end of support 34, is the plate 15, also extending diametrically across ends of cylindrical members 33 and 30, and allowing for passage of silage down through cylindrical member 33, into the chute 30. On the exterior of the chute 30, is mounted a motor 36 (preferably on an adjustable base, not shown, for belt take-up), generally of the electric type, for driving a pulley 37, that in turn drives pulley belts 38 for rotating shaft 40. Pulley member 41 is, in turn mounted on shaft 40, for driving belts 42 that in turn drive pulley 43, located outside the chute 30, in a location out of communication with the silage passing through the chute 30. A shield 35 comprising sidewalls 44 and top wall 45, protect silage from becoming intermingled with the belts 38 and 40, such shield extending substantially diametrically across the chute 30, but allowing substantial passageways on each side of the upstanding shield portions 44, for passage of silage therethrough, to a zone beneath.

It will be understood that the rotation of the shaft 40 drives a transmission that effects a right angle change of direction (not shown) in effecting substantially constant speed rotation of the auger 12 about its own axis.

At the lower end of the chute 30, there is a chute opening 47 therein, terminating in a seal 48. The shield 35 has an access door 50 in its bottom wall 46 openable upon release of latch 51 to access a large nut 49 that is keyed onto shaft 40. If the auger 12 ever jams under a load of silage, a large wrench on nut 49 can effect manual rotation of the auger, and release it.

When silage is delivered to the exit auger 53 via opening 47, it may then be conveyed to the exterior of the silo. To this end, drive shaft 54, driven from shaft 39 through manual clutch 59 (openable by lever 59') provides rotation via shaft connections 37', 37", and 37''' (schematically shown) for the auger 53, through a suitable transmission device 56.

The inlet chute 52 may be removed from its location beneath the lower end 57 of the discharge chute 30, in any suitable manner.

Figure 3:
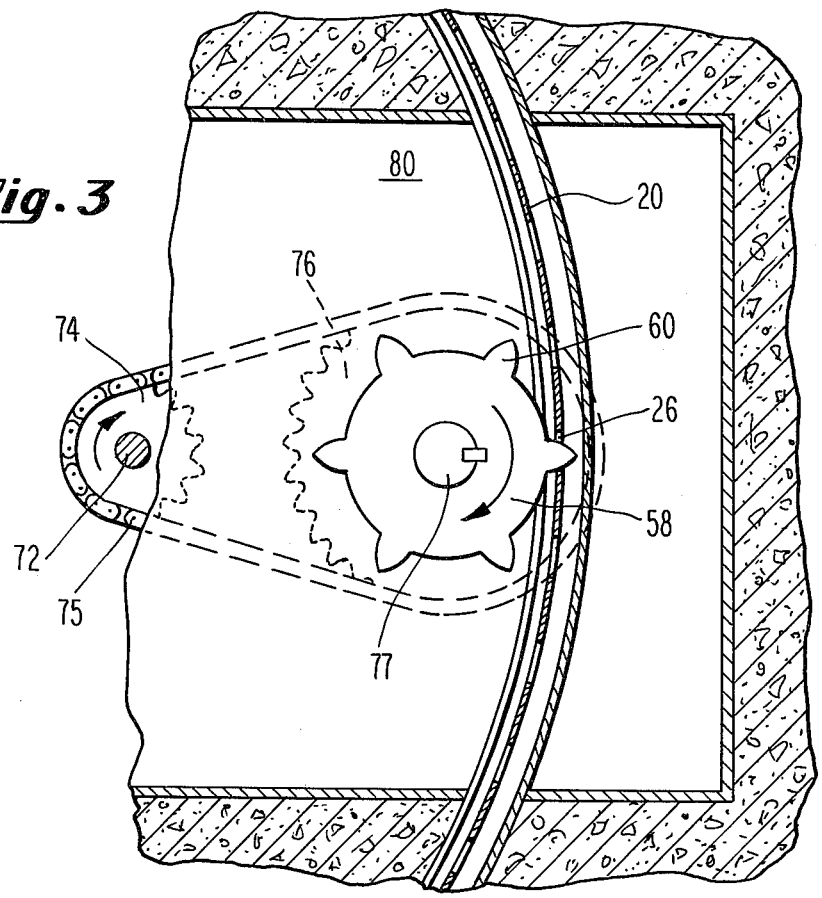
FIG. 3 is a transverse sectional view taken through the drive mechanism for the drive band, that is illustrated in FIG. 1, with the view being taken generally along the line III—III of FIG. 1, and wherein the toothed wheel for driving the band is illustrated in plan view.
Figure 2:
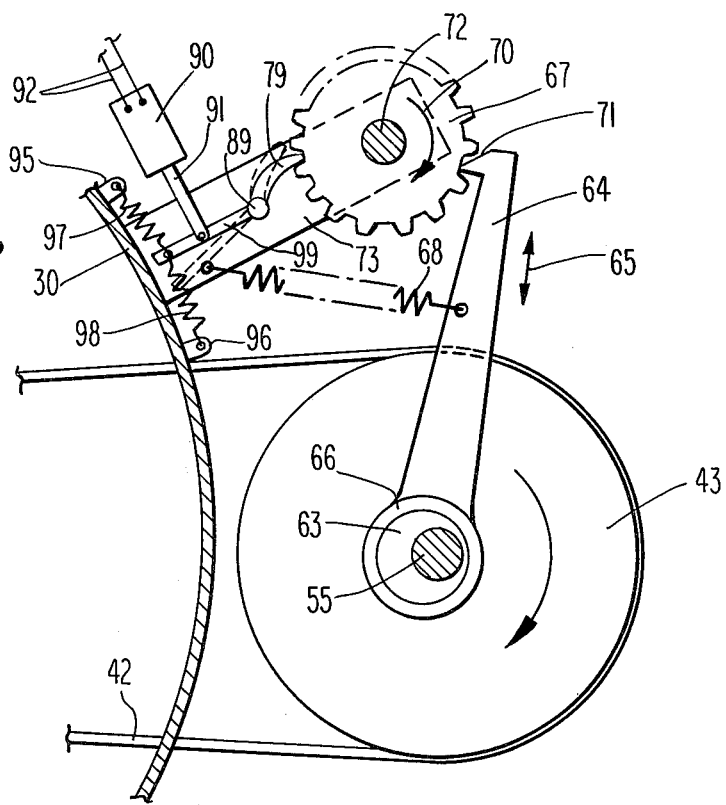
FIG. 2 is an enlarged and fragmentary transverse sectional view, taken generally along the line II—II of FIG. 1, and illustrating an example of a conversion of substantially uniform rotary motion, into intermittent rotary motion.

As the pulley 43 drives the shaft 55, means is provided for transferring the uniform or relatively constant speed rotation of the shaft 55, into an intermittent rotational motion of the toothed wheel 58, the teeth 60 of which engage band openings 26 as shown in FIG. 3, for driving the band 20 in its intermittent drive for effecting a sweeping of the auger across the silo floor, so that the sweeping motion of the auger 12 into silage provides an alternate advance and hesitation, followed by alternate advance and hesitation, etc. It will be understood that means is provided for changing the rotational drive of the shaft 55, into an intermittent rotational drive for the toothed wheel 58. A preferred form of such motion-changing device may include an eccentric 63 carried on the shaft 55, for movement therewith, with the eccentric 63, in turn, providing a back-and-forth, or cyclic component of motion for the pawl 64, as shown by the arrow 65, when the cam 63 slides in the bearing 66 of the pawl 64. The outer end of the pawl 64 may engage a toothed wheel as at 67, spring loaded thereagainst as at 68, for engaging teeth of the gear-type wheel 67, in its downward motion as illustrated in FIG. 2, to effect intermittent rotation of the gear 67, as indicated by the arrow 70. In upward motion, the pawl 64 can slide over an upper adjacent toothed wheel as viewed in FIG. 2, by means of a cam surface 71, to engage a next adjacent tooth. The toothed wheel 67 is suitably mounted for such rotation, on a shaft 72, that in turn may be suitably carried by a support 73 mounted on the exterior of the chute 30. In order to ratchet the gear 67 to assure its motion in the direction of arrow 70, a ratchet pawl 79 is carried for movement with pivot shafts 89, in turn carried by support 73. Lever arm 99 projects from pivot shaft 89 and is normally maintained activated by the solenoid 90 with pawl 79 in engagement. The springs 97 and 98 are mounted on wall 30 at 95 and 96, respectively. A rod 91 of solenoid 90 is in engagement with the lever arm 99, such that, when the solenoid 90 is not actuated to maintain engaged position of the rod 91, the springs maintain the ratchet pawl 79 such that it is not in engagement with the teeth of gear 67 as shown in phantom lines in FIG. 2, out of engagement, as shown in phantom in FIG. 2, as the springs cause the pivot shaft 89 to pivot an amount allowed by inactivation of the solenoid 90. This action of the solenoid 90 allows a balance of the springs 97 and 98 to inactivate the ratchet pawl. When the solenoid 90 is not so actuated, it will be seen that lever arm 99 is therefore spring-returned to a gear-engaged position of the ratchet pawl 79. The solenoid 90 is actuated by an electric current actuated ampresponsive device called a current and load relay 93 electrically connected with the motor 36, through leads 92. Thus, as the auger is rotating on its own axis and advancing into the silage, across the silo floor, if the resistance of the silage reaches a predetermined level (pre-set for relay 93), the increased amperage that will be drawn by the motor 36 will be noted by the relay 93, and will de-activate the solenoid 90, for effecting disengagement of the ratchet pawl 79 in the manner aforesaid, so that the intermittent drive of the pawl 64, in its back-and-forth motion in the directions of the arrow 65, will effect only a rocking back-and-forth for the gear 67, rather than a continued advancement of the band, until sufficient silage has been cleared away by continued rotation of the auger, such that it then becomes feasible for the advance of the auger to be continued. When such a point is reached, the amperage drawn by the motor 36 will be reduced, and the solenoid 90 reactivated, such that the springs 97 and 98 acting on the lever arm 99 may return the ratchet pawl 79 to its full line position illustrated in FIG. 2.

In any event, upon providing intermittent rotational motion to the shaft 72, such motion is transferred to a pair of sprockets 74 carried thereby, which in turn drive chains 75, that in turn drive sprockets 76, for rotation of shaft 77, and consequently for rotation of the toothed wheel 58 carried thereby.

It will be seen, from FIG. 3, that the mechanism for driving the band 20 is housed in a confined zone 80 located beneath the floor of the silo, out of communication with silage.

Figure 4:
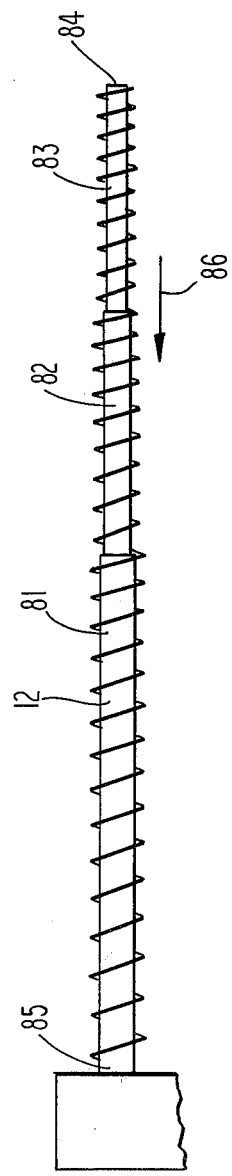
FIG. 4 is a schematic view of an auger in accordance with this invention, that is of stepped diametral configuration.

With reference now to FIG. 4, the auger 12 is illustrated in more detail, as comprising three step portions 81, 82 and 83, that are of increased diameter as measured at the base of the fliting, in each instance, going from the radial outer-most end of the auger 84, to the radial inner end 85, for conveying of silage in the direction of the arrow 86.

Figure 5:
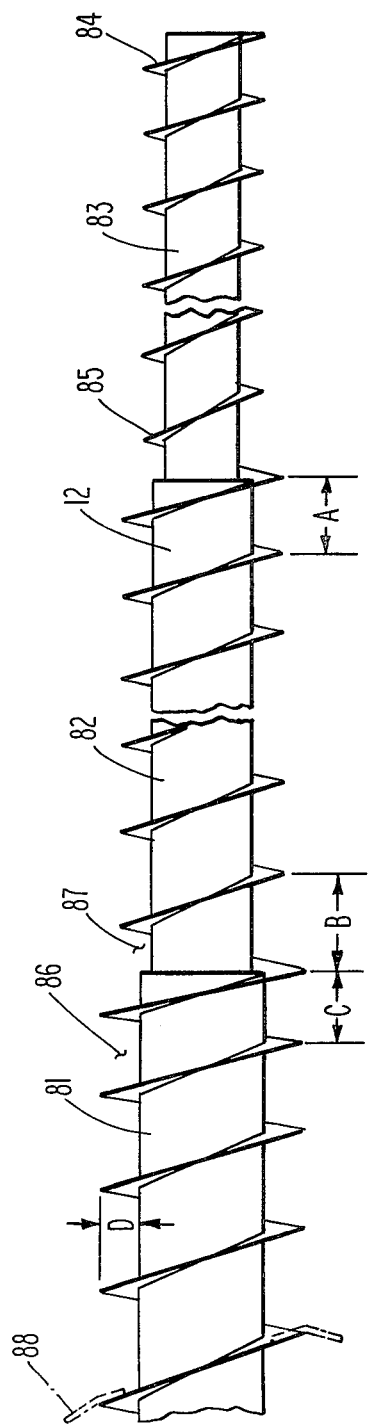
FIG. 5 is an enlarged fragmentary view of the auger illustrated in FIG. 4, with portions broken away for the sake of clarity, and wherein variations in pitch and in flite depth are more clearly illustrated, also with cutting blades being illustrated in phantom, as a desirable option.

With particular reference to FIG. 5, it will be seen that there is provision for enlarging the conveyance capacity of the auger along its length. To this end, it will be noted that in stage 83, the pitch, or distance between adjacent threads of the fliting 84 increases from a smallest measurement coaxially with the axis of the auger 12, toward a largest measurement at the leftmost end of stage 83, at flite 85. It will be noted that, this increased pitch is gradual throughout stage 83. Similarly, stages 82 and 81 have increased pitch from their radial outer most ends, toward their inner most ends, as illustrated in FIG. 5, for enlarging the conveyance capacity of the auger along its length. As silage conveyed along the length of the auger jumps from a smaller diameter stage to a large diameter stage, it will be noted that the allowable volume between flites of a larger diameter stage, such as that at 86, can handle a greater silage volume than the immediately preceding fliting portion 87, and consequently, the pitch at the commencement of a larger diametral stage may be less than the pitch at the end of the next previous stage. For example, the pitch "A" at the commencement of stage 82, is smaller than the pitch "B" at the termination of that stage, but the pitch at the commencement of next adjacent stage 81 (in the direction of silage flow) is less than that "B" would be, but yet still can handle more silage, because of the larger volume defined at that location 86 than at the next previous location 87.

Also, it will be noted that the depth "D" of auger fliting remains constant along any given stage, but such fliting depth is greater for stage 81 than for 82, and is greater for stage 82 than for stage 83, for the purpose of increasing the bite of the auger into silage along its length, albeit a stepped increase. This, together with the gradually increasing pitch along each stage allows for the auger 12 to take in granular silage at all locations along its length, rather than just conveying silage from the radial outer most end toward the interior without picking up additional silage along the way. Accordingly, with the present arrangement, additional silage may be picked up along the length of the auger, such that the silo may be emptied fairly uniformly irrespective of the radial distance of the silage from the center of the silo.

It will also be understood that, in lieu of the stepped increase in diameter of the various auger stages, and in lieu of the stepped increase in fliting depth "D", it would be possible to have a tapered auger with a gradually increasing fliting depth "D" for accomplishing the same end.

At the left-most end of FIG. 5, there are illustrated, in phantom, a plurality of cutting knives 88, constructed similarly to those illustrated and disclosed in my U.S. Pat. No. 4,076,133 (the disclosure of which is herein incorporated by reference) for assisting the bite of the auger fliting into the silage. However, when use of such an auger is made, with granular type silage, fewer knives 88 are needed than disclosed in U.S. Pat. No. 4,076,133, and substantially only about one-third as many knives are required with granular material.

With reference to the lower end of FIG. 1, it will be seen that the fliting 100 for the exit auger is of continually increasing depth along the auger length, from a position at its lower end, or inlet to the auger 53, up toward the exit end outside of the silo (not shown). It will be noted that the continually increasing depth of auger fliting likewise facilitates an increase of auger bite along its length that prevents the packing of silage between flites, and that also enlarges the conveyance capacity of the auger along its length toward discharge.

It will be apparent from the foregoing that the ends of the invention are accomplished, in providing for the handling of granular free flowing or substantially free flowing silage. The particular illustrations herein, some partially schematic in nature, are by way of example only, and are not intended to be limiting in any respect. While various modifications may be made in the details of construction, and in the use and operation of the device in accordance with the present invention such will all be within the spirit and scope of the invention as defined in the appended claims.

I claim:

1. In a silo unloader of the bottom unloader type having an unloading auger generally radially disposed at the bottom of the silo and mounted for rotation on its own substantially horizontal axis and for intermittent arcuate sweeping movement across the floor of the silo by means of a drive band located in the floor of a silo, the improvement comprising a generally vertical central drive shaft disposed at the center of the silo beneath the floor thereof and operationally connected to the auger for rotationally driving the auger on its own axis, motor type drive means for driving said shaft and located in the vicinity of the center of the silo near said shaft, and rotationally driven auger advance drive means mechanically connected to said shaft for receiving its driven rotation from said shaft and operationally connected to said drive band for driving said band and consequently driving the auger mounted thereon, in a uniform intermittent sweeping motion across the silo floor.

2. The apparatus of claim 1, wherein said rotationally driven auger advance drive means includes a toothed wheel in driving engagement with uniformly spaced openings in the band.

3. The apparatus of claim 1, wherein said auger advance drive means includes means receiving uniform rotational drive from said shaft, converting means converting said uniform rotational drive to an intermittent rotational drive, and connecting means connecting said intermittent rotational drive to said band.

4. In a silo unloader of the bottom unloader type having an unloading auger generally radially disposed at the bottom of the silo and mounted for rotation on its own axis and for intermittent arcuate sweeping movement across the floor of the silo by means of a drive band located in the floor of a silo, the improvement comprising a generally vertical central drive shaft disposed at the center of the silo beneath the floor thereof and operationally connected to the auger for rotationally driving the auger on its own axis, drive means for driving said shaft, and rotationally driven auger advance drive means connected for driven rotation from said shaft and operationally connected to said drive band for driving said band and consequently driving the auger mounted thereon, in a uniform intermittent sweeping motion across the silo floor, and wherein said auger advance drive means includes means receiving uniform rotational drive from said shaft, converting means converting said uniform rotational drive to an intermittent rotational drive, and connecting means connecting said intermittent rotational drive to said band, and wherein said converting means comprises an eccentric cam driving a drive pawl in a substantially linear back-and-forth motion, a gear-like member, and means sequentially urging said drive pawl into and out of engagement between teeth of said gear-like member, for rotating the same during the back-and-forth motion of said drive pawl.

5. In a silo unloader of the bottom unloader type having an unloading auger generally radially disposed at the bottom of the silo and mounted for rotation on its own axis and for intermittent arcuate sweeping movement across the floor of the silo by means of a drive band, the improvement comprising a drive shaft operationally connected to the auger for rotationally driving the auger on its own axis, drive means for driving said shaft, and rotationally driven auger advance drive means connected for driven rotation from said shaft and operationally connected to said drive band for driving said band and consequently driving the auger mounted thereon, in a uniform intermittent sweeping motion across the silo floor, wherein said auger advance drive means includes means receiving uniform rotational drive from said shaft, converting means converting said uniform rotational drive to an intermittent rotational drive, and connecting means connecting said intermittent rotational drive to said band, wherein said converting means comprises a eccentric cam driving a drive pawl in a substantially linear back-and-forth motion, a gear-like member, and means sequentially urging said drive pawl into and out of engagement between teeth of said gear-like member for rotating the same during the back-and-forth motion of said drive pawl.

6. The apparatus of claim 5, wherein said drive means includes a motor, including overload means for discontinuing the auger advance, said overload means comprising a normally connected disconnect pawl moveable between positions into and out of connecting engagement with said gear-like member, solenoid means for keeping said disconnect pawl in connecting engagement, and combination sensor and actuator means connected to said motor for sensing a predetermined load and de-activating said solenoid means when said predetermined load is reached.

7. The apparatus of claim 1, including a nut at the lower end of the central drive shaft, said nut being fixedly mounted thereon against rotation and providing means for manual dislodgment of said auger from silage by engagement by a wrench applied to the nut.

* * * * *